Figure 13:
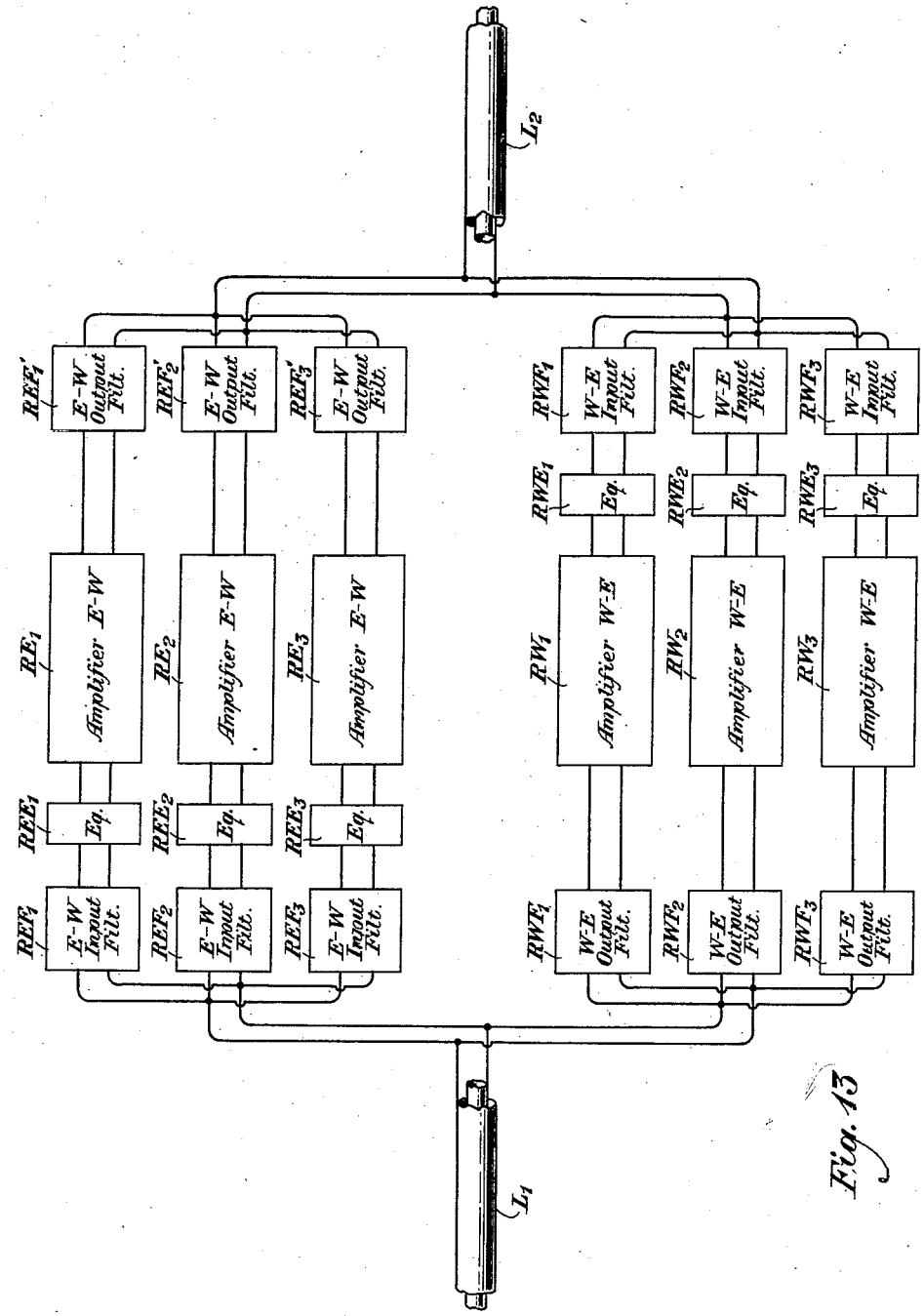

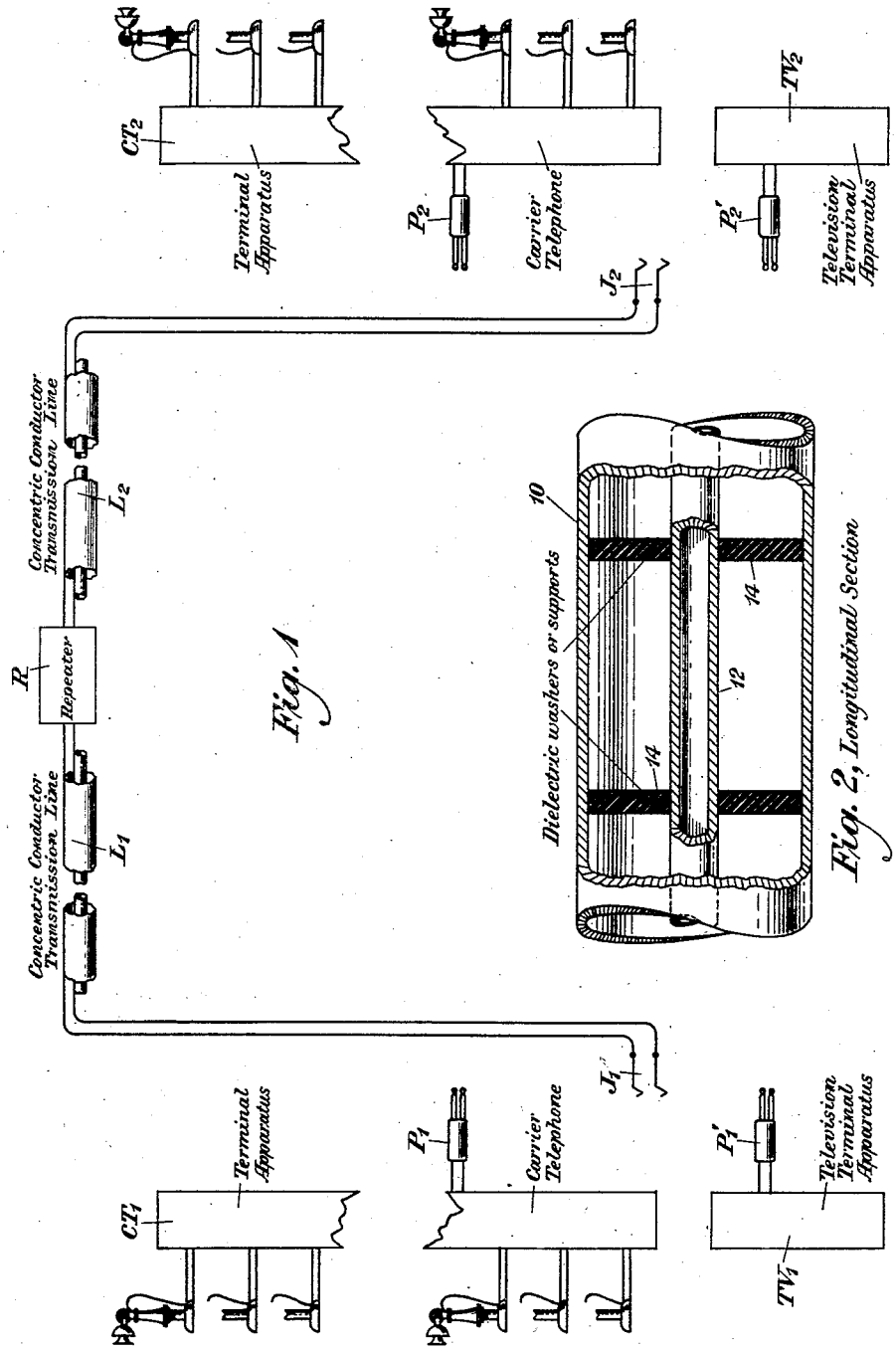

Dec. 8, 1931.  L. ESPENSCHIED ET AL  1,835,031
CONCENTRIC CONDUCTING SYSTEM
Filed May 23, 1929  11 Sheets-Sheet 2
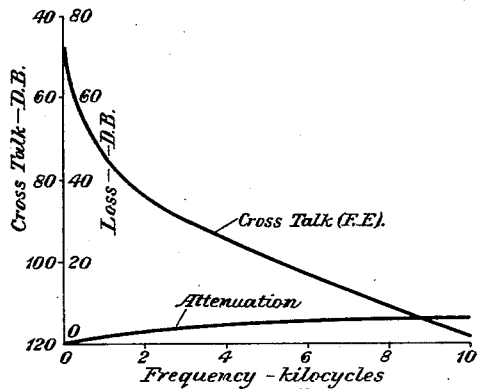
*Fig. 3*
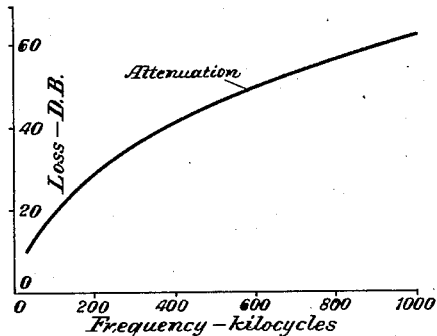
*Fig. 4*
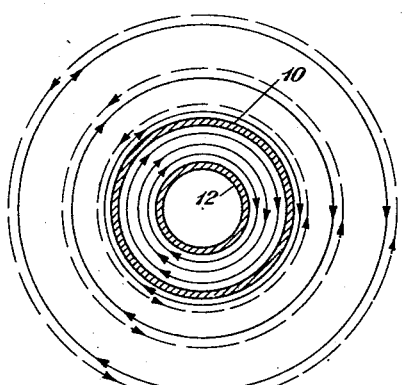
*Fig. 5, Magnetic Field*
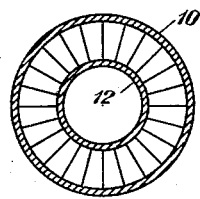
*Fig. 7, Electric Field*
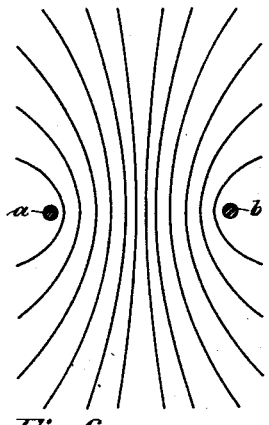
*Fig. 6, Magnetic Field*
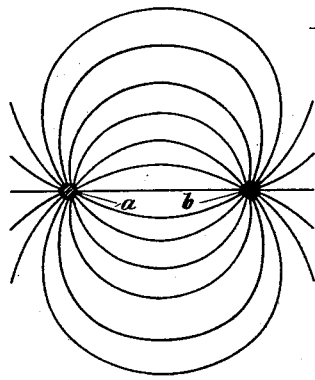
*Fig. 8, Electric Field*
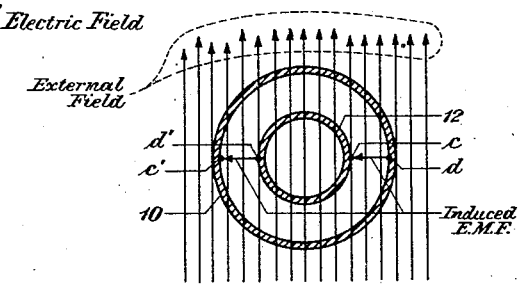
*Fig. 9*
INVENTORS
L. Espenschied and H. A. Affel
BY
ATTORNEY

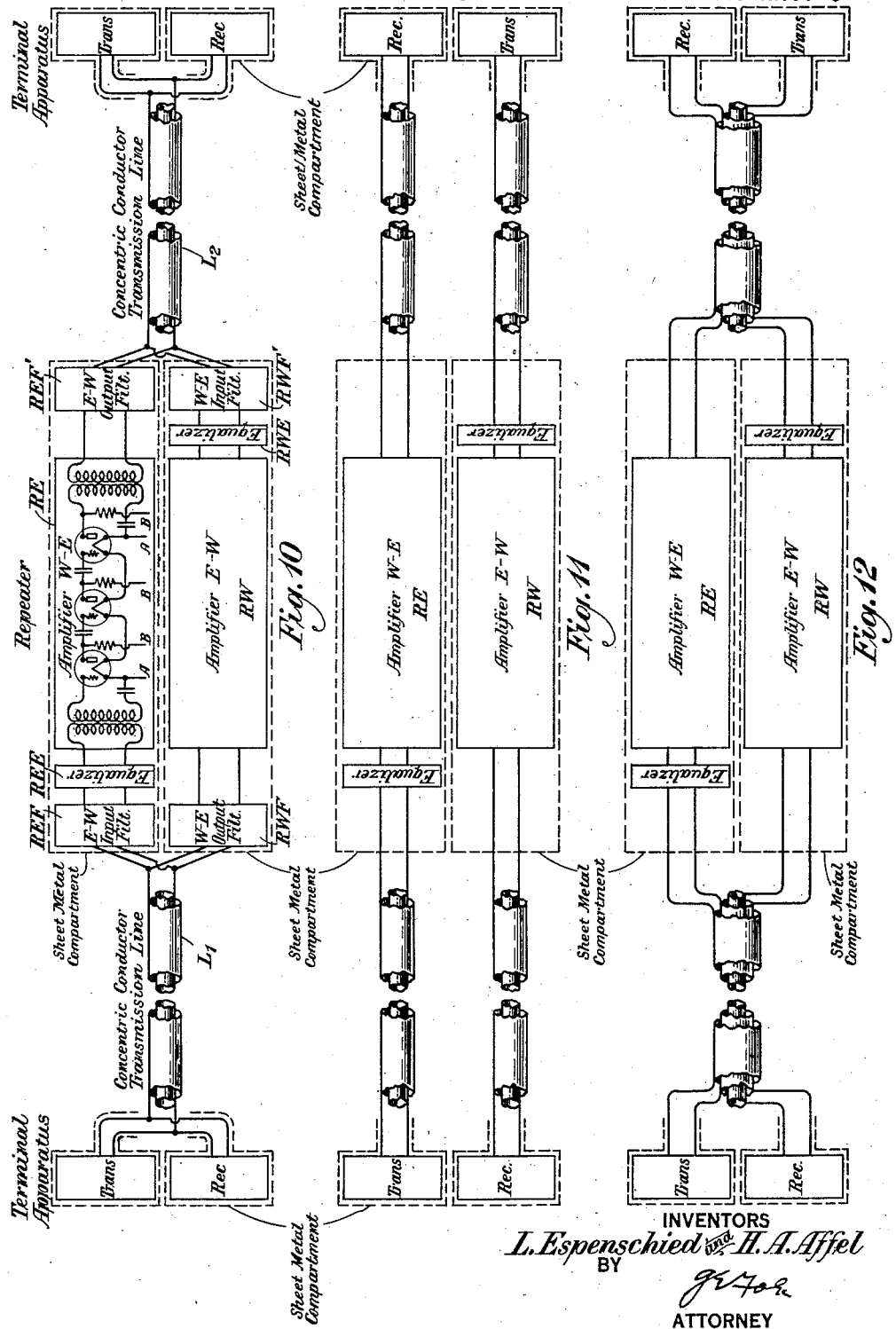

Dec. 8, 1931.   L. ESPENSCHIED ET AL   1,835,031
CONCENTRIC CONDUCTING SYSTEM
Filed May 23, 1929    11 Sheets-Sheet 6

INVENTORS
L. Espenschied and H.A.Affel
BY
ATTORNEY

Dec. 8, 1931.  L. ESPENSCHIED ET AL  1,835,031
CONCENTRIC CONDUCTING SYSTEM
Filed May 23, 1929  11 Sheets-Sheet 9
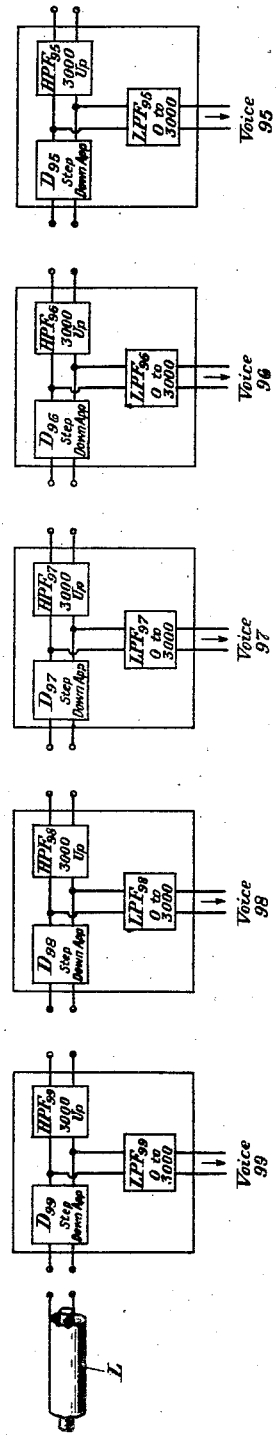
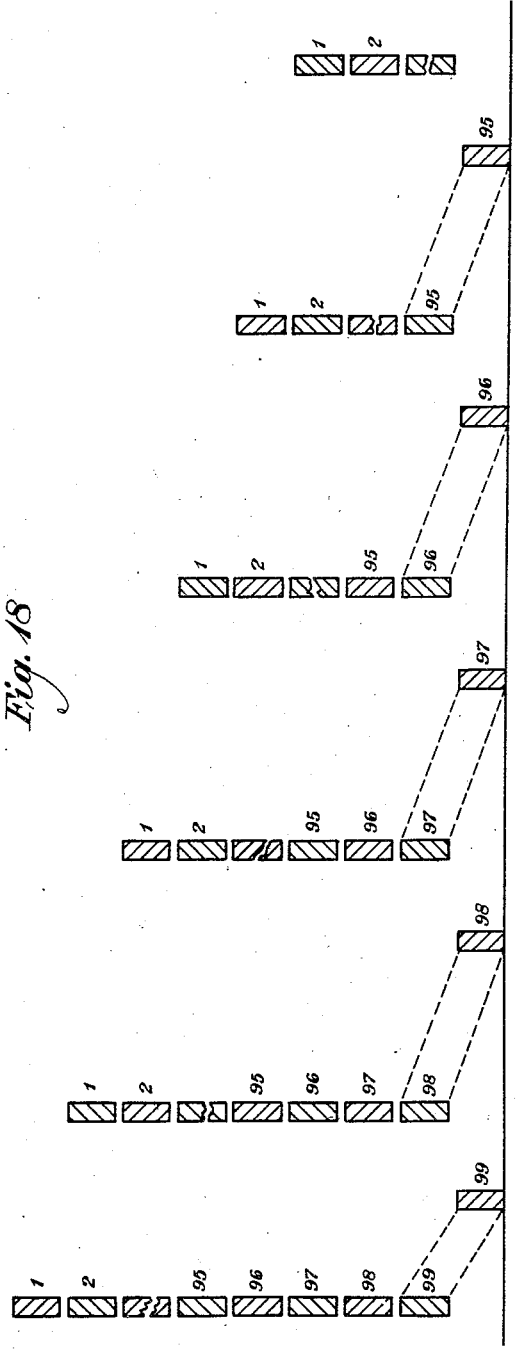
Fig. 18
INVENTORS
L. Espenschied & H. A. Affel
BY
ATTORNEY

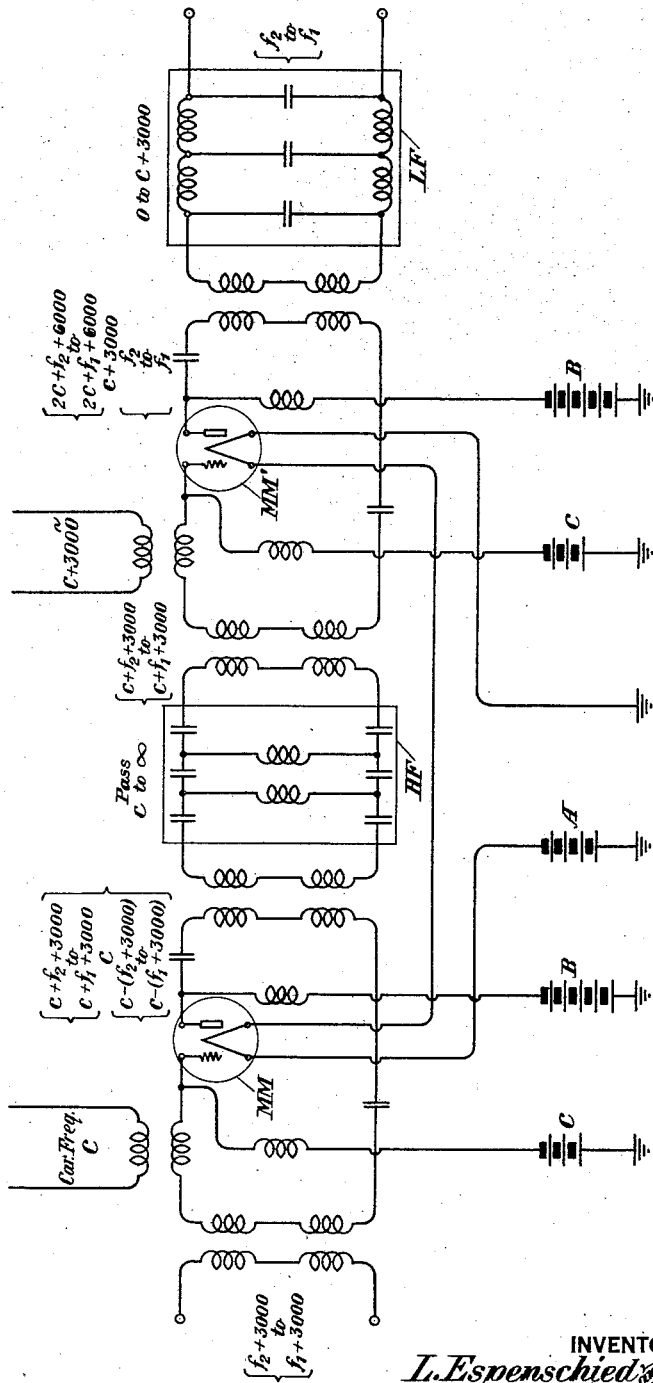

Patented Dec. 8, 1931

1,835,031

UNITED STATES PATENT OFFICE

LLOYD ESPENSCHIED, OF KEW GARDENS, NEW YORK, AND HERMAN A. AFFEL, OF RIDGEWOOD, NEW JERSEY, ASSIGNORS TO AMERICAN TELEPHONE AND TELEGRAPH COMPANY, A CORPORATION OF NEW YORK

CONCENTRIC CONDUCTING SYSTEM

Application filed May 23, 1929. Serial No. 365,526.

This invention relates to transmission systems, and more particularly to a novel form of conductor structure and associated apparatus for the guided transmission and utilization of a very wide band of frequencies whose width may be of the order of a millon cycles or more.

The art of television in particular has emphasized the need for transmission line systems having enormously wide frequency range requirements. Whereas individual channel requirements of telegraphy are of the order of a few hundred cycles at most, and telephony perhaps a few thousand cycles, television may require transmission of bands hundreds of thousands of cycles in width to insure a reasonable degree of picture detail. At the same time, of course, a transmission channel satisfying television requirements, gives opportunity for breaking up a very wide frequency band into perhaps hundreds of telephone channels.

The types of transmission line systems now in use will not satisfy the television requirements for long distance transmission which must be met eventually. For example, cable circuits with their small-gauge high capacity pairs provide inherently channels of relatively low frequency range with high attenuation. They are more or less ideal where the communication requirements call for many channels of the voice frequency range, and where repeaters can be inserted at frequent intervals, but are unsuited for broad band transmission.

Open wire circuits, because of the wider separation of wires and larger conductors, afford a broader frequency transmission range, sufficient to meet the needs of three or four channel carrier telephone systems, and perhaps even modest television systems, but they suffer from two inherent and serious limitations. The first of these is the fact that the shunt losses are variable with weather because of the open type insulation employed. Problems of stability of transmission are, therefore, very serious, particularly in connection with the use of higher frequencies. The second inherent defect is that of susceptibility to interference. The widespread electromagnetic and electrical fields created by the open construction make it difficult to prevent cross-talk between pairs in close proximity, and they make the circuit relatively susceptive to external interference, power noise, static, etc. In this latter respect, of course, the open wire line is markedly inferior to the cable system with its tightly bound, closely shielded group of conductors.

It may be noted that a wide range of frequencies can, of course, be transmitted by radio, particularly by making use of the shorter wave lengths. The short wave radio method is, however, subject to serious limitations with respect to reliability and stability of transmission, together with interference, and the fact that there is only one frequency spectrum available for the whole world. It would be extremely advantageous, therefore, for the further development of the art if it were possible to transmit such wide frequency ranges in more or less self-contained wire transmission paths, protected from outside electrical influences and capable of having amplifiers inserted at intervals along their lengths.

In the case of cable circuits the frequency range heretofore employed has not exceeded about 5,000 cycles. Means are known whereby it is possible to employ frequencies up to about 8,000 cycles, and some consideration has been given to the use of still higher frequencies up to 20,000 or 30,000 cycles. In the open wire lines the range is now employed up to about 30,000 cycles, and it seems reasonable to expect that in due time frequencies up to perhaps 50,000 or 60,000 cycles may be economically employed. However, these frequency ranges would seem to be far from meeting the needs of a television system having an adequate degree of detail for all purposes, and comparing, for example, with telephotograph pictures or movies, which would require from 200,000 to over a million cycles band width.

To meet this situation it is proposed in accordance with the present invention to employ a novel form of transmission system involving a large single pair concentric conductor arrangement, which does appear to meet such wide band requirements. It permits the use of conductors in tubular form having low skin effect and low conductor losses for high frequencies. It permits also the possibility of a construction in which the dielectric is largely air, low loss insulation spaces being employed at wide intervals to separate the inside from the outside conductors. It permits of a complete metallic conductor path in a shield which at the same time serves as one of the conductors. This shield, properly made, serves to keep moisture from the dielectric space between the inside and outside conductors. It serves electrically to afford an almost perfect barrier for the cross-talk between adjacent similar type conductors or interference from external fields, a barrier which is extraordinarily useful because its effectiveness increases as the frequency is raised.

The structure as a whole may be made semi-flexible and supported overhead on a pole line by means of a messenger wire as any ordinary overhead cable, or it may be made more rigid and placed in conduit underground. The present invention, while it relates to the use of a large diameter concentric conductor system as a means for transmitting a very wide band of frequencies, is not so much concerned with the precise physical form and mechanical design of the pipe-like structure, as it is with its general use in combination with terminal apparatus to form an overall system whereby wide frequency bands may be impressed upon it, protectively transmitted along it, amplified at intermediate stations, and taken off and translated at the receiving end.

Figure 14:
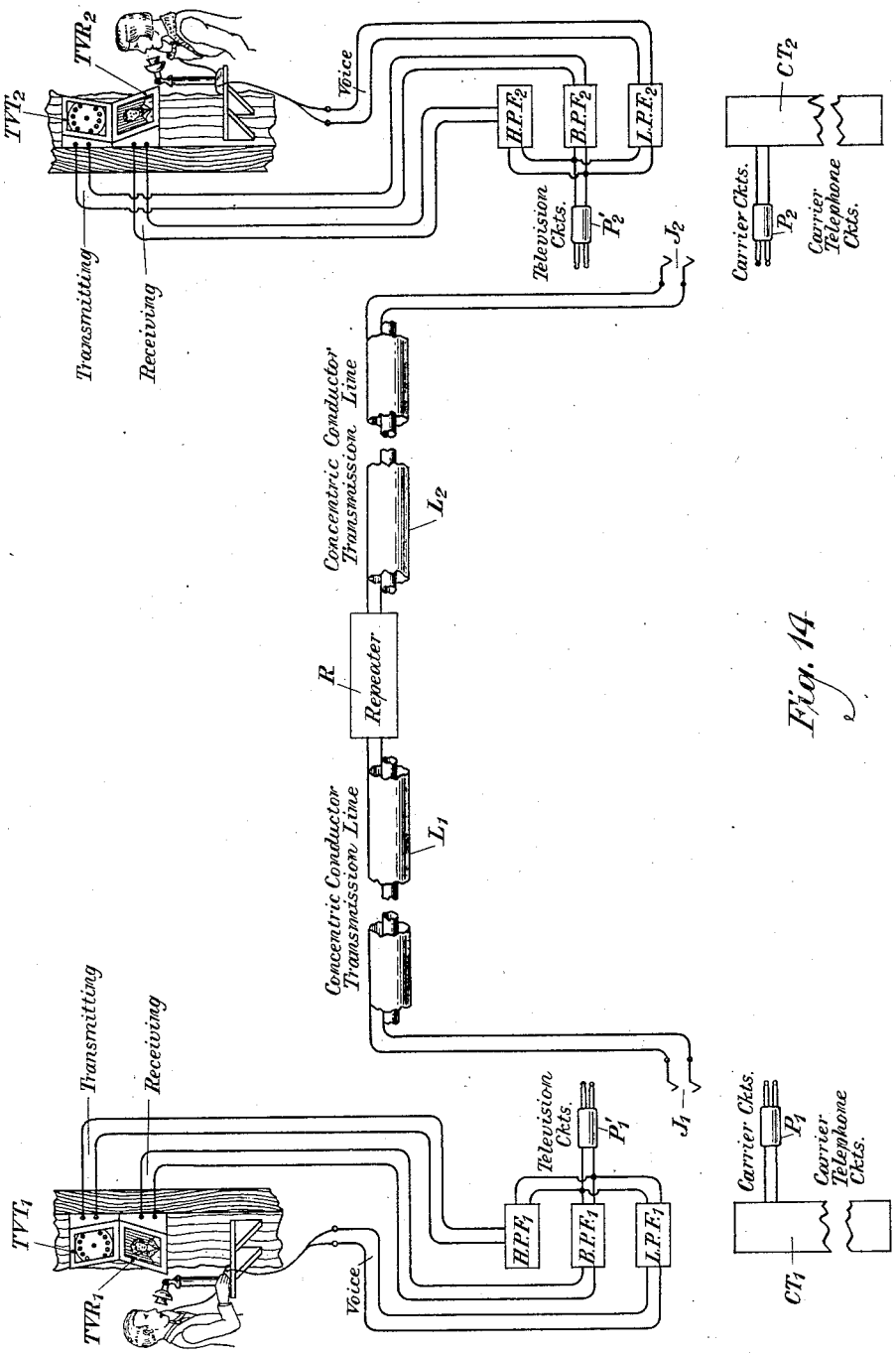
Figure 15:
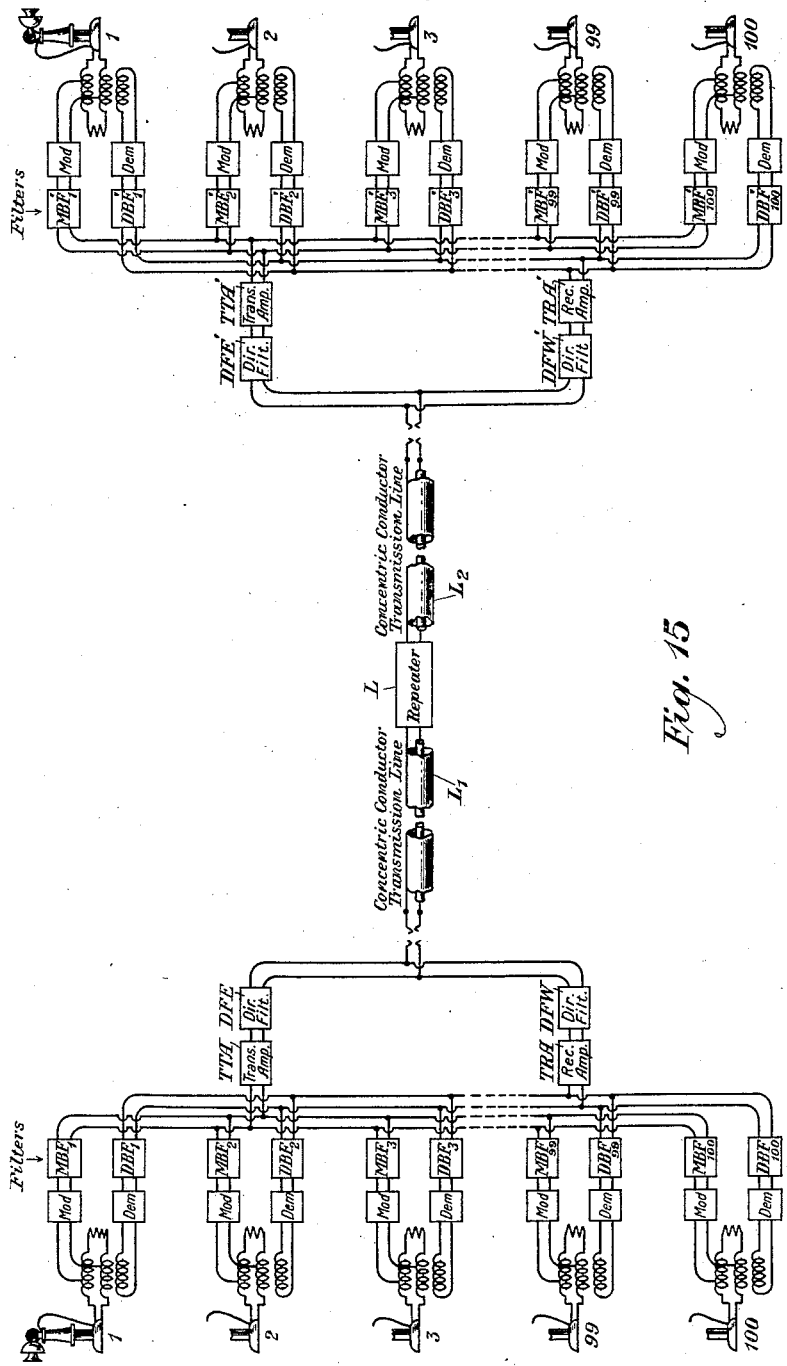
Figure 16:
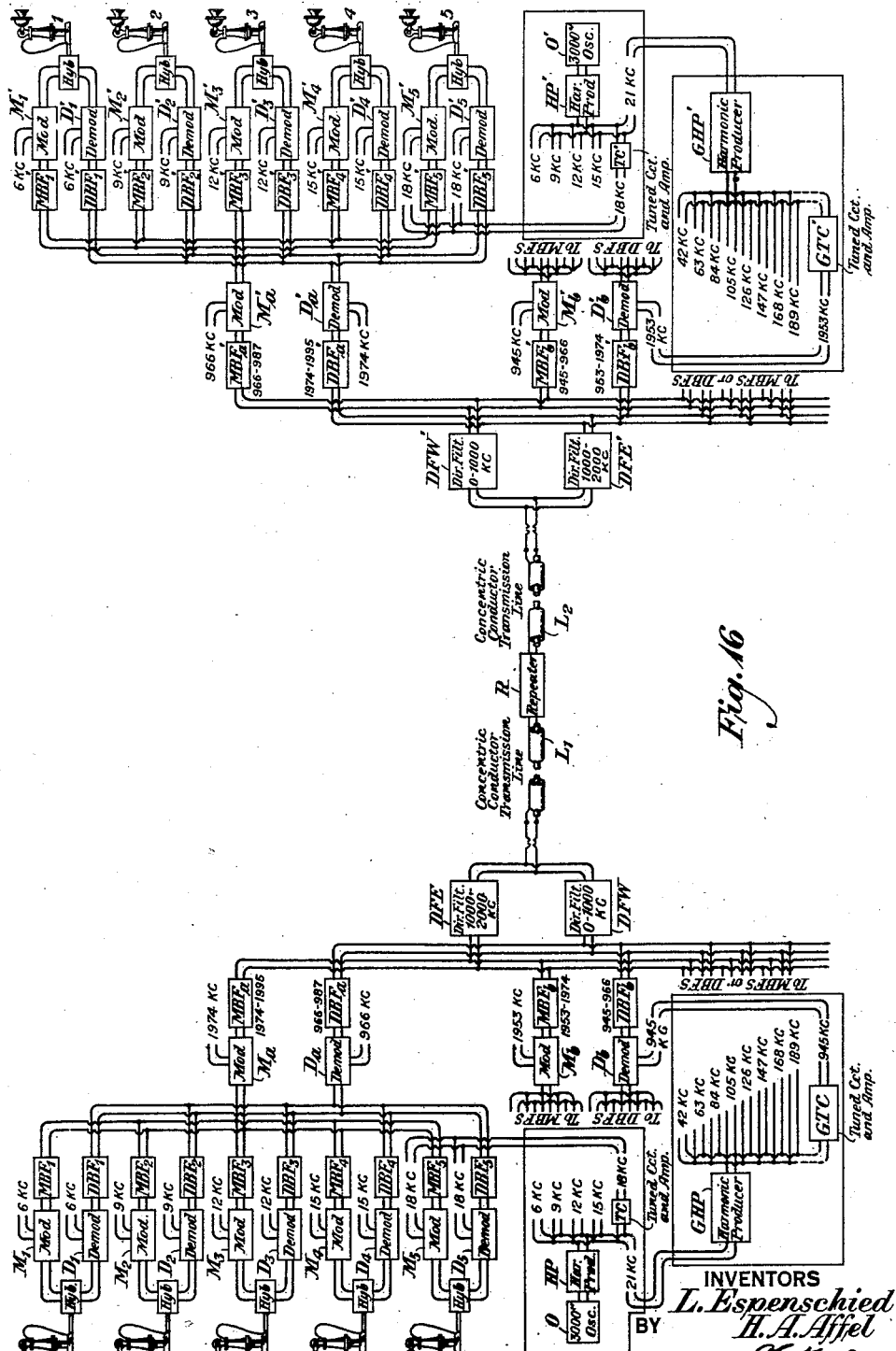
Figure 17:
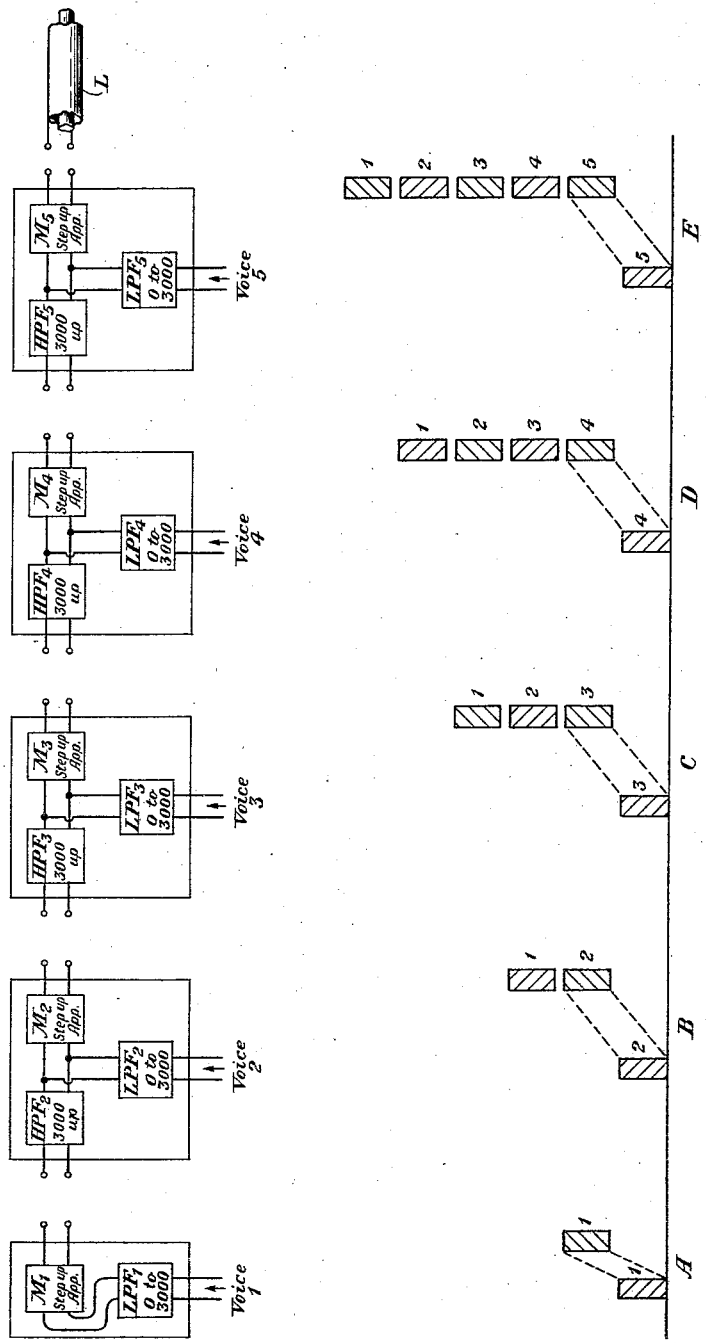
Figure 19:
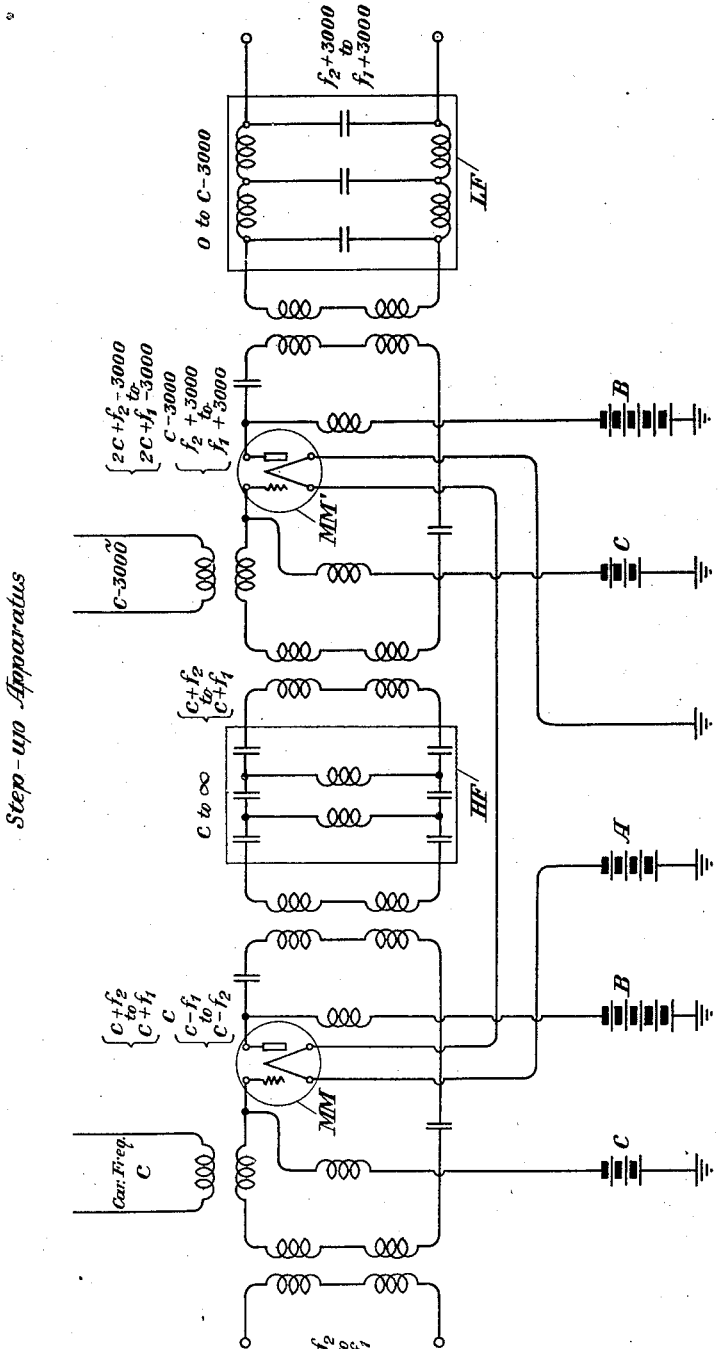

The invention may be more fully understood from the following description, when read in connection with the accompanying drawings, in which Figure 1 is a schematic diagram of an embodiment of the overall system of the invention; Fig. 2 shows a section of the concentric conductor arrangement employed; Figs. 3 to 9, inclusive, are curves illustrating the characteristics of the conductor system; Figs. 10, 11, 12 and 13 are schematic diagrams showing different ways in which intermediate repeaters may be connected in the concentric conductor system; Fig. 14 is a schematic diagram showing another embodiment of the overall system of the invention; Fig. 15 is a diagram showing terminal carrier apparatus associated with the concentric conductor system; Fig. 16 is a similar diagram showing how double modulation and demodulation may be employed for splitting up the available frequency range into a large number of carrier channels; Figs. 17 and 18 are schematic diagrams showing how tandem modulating and demodulating equipment may be used for splitting up the available frequency range into carrier channels; Fig. 19 is a detailed diagram of the modulating arrangement employed in connection with Fig. 17; and Fig. 20 is a detailed circuit diagram of the demodulating arrangement employed in connection with Fig. 18.

Overall system

An overall system embodying the invention is schematically illustrated in Fig. 1. Here the concentric conductor structure is shown in two sections $L_1$ and $L_2$ with an intermediate repeater R between the sections and with the terminal apparatus at the ends. In order to illustrate the several alternative uses of such a transmission path, jacks $J_1$ and $J_2$ and plugs $P_1$, $P'_1$, $P_2$ and $P'_2$ are indicated at the ends whereby the concentric conductor may be connected to any one of several sets of terminal apparatus, which, by means of suitable filters, modulators, demodulators, etc., more particularly described hereinafter, carve up the total frequency range available in accordance with the particular use required.

Examples of two sets of terminal apparatus are shown schematically. One set comprises a very wide band television channel apparatus which may occupy the entire frequency spectrum of the concentric conductor structure, such television apparatus being symbolically indicated at $TV_1$ and $TV_2$. The plugs $P'_1$ and $P'_2$ serve to connect these pieces of apparatus to the transmission line. The alternative terminal apparatus comprises carrier telephone terminal arrangements symbolically represented at $CT_1$ and $CT_2$, these pieces of apparatus being connected to the transmission line at will by means of plugs $P_1$ and $P_2$. In the case of the carrier telephone equipment it will be seen that with a total frequency spectrum of, say, 500,000 cycles available for transmission in either direction, and assuming that a one-way channel is obtained for each subband width of 3,000 cycles, there might be provided a total of somewhat over 150 telephone message channels. Thus, the proposed type of structure will be seen to be comparable to the ordinary toll cable in respect to toll message carrying capacity.

The concentric transmission conductor may assume various forms but, as illustrated in Fig. 2, it comprises an outer tubular conductor 10 of copper or other conductive material with a second tubular conductor 12 concentrically mounted with respect to the tube 10. The conductors are so associated with the terminal apparatus that the one tubular conductor acts as a return for the other and not as a mere shield.

In order that the attenuation may be small at high frequencies, the leakage loss between the conductors must be a minimum. As the leakage loss is due to the nature of the dielectric interposed between the conductors, the dielectric should be principally of air, as air introduces no leakage loss. Accordingly, the two conductors are held in proper concentric relation and out of electrical contact with each other by means of spaced dielectric washers 14. These washers should be separated from each other a suitable distance and should be made as thin as possible consistent with the required mechanical strength, and they should also be composed of some dielectric of small loss angle and low dielectric constant, since if these conditions are obtained, the leakage loss (which in the ordinary open wire system comprises a large part of the attenuation) may be made so small as to be practically negligible. For example, hard rubber, or preferably, pyrex glass or isolantite, may be used for the insulating washers 14.

*Transmission characteristics*

As will be explained later, a conducting system of this type will be practically free from external interference even though the outer conductor is grounded. It is therefore possible to mount the concentric conductor arrangement upon the metallic supports of an ordinary overhead cable structure or to permit the arrangement to be buried directly in the ground or laid in a conduit such as might be employed for underground cable. No insulation between the outer conductor and any external conducting system is necessary in order to prevent interference. The insulation of the system, so far as it affects transmission, is therefore confined entirely to the space between the two concentric conductors. Consequently, by making the external conductor waterproof, the leakage due to the dielectric of which the washers 14 are composed, will not change with wet weather, and the surfaces of the dielectric washers will not deteriorate with time, due to the accumulations of dirt or other foreign substances. The leakage loss of the system will therefore be confined to that leakage loss which will be due to the dielectric material of which the washers are composed when the washers are new, clean and dry. If reasonably good dielectric material is employed, the leakage loss due to the supporting washers will be practically negligible, and if a material of very low loss angle and dielectric constant is used, as above suggested, the factor of attenuation which is due to leakage will be so small as to be practically negligible. In ordinary open wire line construction (which has the lowest attenuation at high frequencies of any type of construction now employed in telephone practice), the attenuation due to leakage loss has been very large and in wet weather becomes enormous. With the present type of construction this factor of attenuation becomes of little importance, and any attenuation due to this factor is fixed and unchangeable with variations in weather conditions.

In the ordinary type of conductor system, either open wire or cable, where one solid wire acts as a return for another solid wire, the component of the attenuation which is due to the conductor resistance is of great importance at high frequencies. As is well known, where a solid conductor is employed, as the frequency becomes higher more and more of the current tends to flow at or near the surface of the conductor, so that the conductive material near the center of the conductor takes but little part in the action at high frequencies. As a consequence, the conductor resistance increases with frequency as a smaller and smaller part of the cross-section of the conductor is usefully employed. If the same amount of conductor material is arranged in the form of a relatively thin shell, the resistance at any given high frequency is very much reduced because now more nearly all of the material of the conductor is usefully employed in transmitting current. With a system of concentric conductors, such as described in connection with the present invention, both conductors, being in the form of thin hollow shells, offer a much less resistance at high frequencies due to the skin effect for the same amount of conductive material than in the case of an ordinary transmission circuit consisting of two solid wires. In fact, with a system of concentric conductors such as herein disclosed, the current at higher frequencies tends to flow more and more at the inner surface of the outer conductor and the outer surface of the inner conductor, due to the well known skin effect.

The result is that while that component of the attenuation which is due to the conductor resistance increases with frequency, the rate of increase is very much less than in the case of an open wire line. By means of the construction above described, therefore, we have the one component of the attenuation which is due to leakage losses or the so-called "shunt effect" reduced to practically negligible proportions by reason of the fact that the dielectric between the conductors is very largely of air and such other dielectric as is employed introduces but little leakage, while the other component of attenuation, namely that due to the conductor resistance or so-called "series effect" is very much reduced as compared with the ordinary type of conducting system for any given frequency.

The curve of Fig. 4 shows the computed attenuation-frequency characteristic for a section of concentric conductor circuit 100 miles in length, which might be considered as a repeater section. In computing the data for this curve, the outside diameter of the outer conductor was taken as 2½ inches and the thickness of the conductor wall as 0.1 inches. The ratio of the inner diameter of the outer conductor to the outer diameter of the inner conductor was taken as 3.6 to 1. The insulation was computed on the basis of air dielectric with spacing washers about 5 feet apart. The spacing washers, however, affect the computed results very little.

From the curve of Fig. 4 it will be seen that the attenuation is of the order of 60 decibels at a frequency of 1,000,000 cycles. If the structure is an ordinary open wire pair of similar length, this same attenuation would have been reached at a frequency something like 150,000 cycles, but in the case of a single pair in an ordinary loaded toll cable, the same attenuation would have been reached for a band only 5,000 cycles in width. The effective superiority of the concentric conductor from an attenuation standpoint is therefore quite obvious.

Another factor of considerable importance, particularly in connection with the spacing of repeaters in a very long circuit, or in the size of repeaters required to override the interference, is that of the susceptibility of the conductor to external noise or cross-talk. In this connection, the curves of Fig. 3 are of special interest. These curves show the decrease of the cross-talk between two parallel conductor systems as the frequency rises. For example, at 1.5 kilocycles or 1,500 cycles, the cross-talk is 80 decibels; at 5.5 kc. the cross-talk is decreased to 100 db., a drop of approximately 20 db. or a 10:1 volume crosstalk reduction. This progressive reduction in cross-talk as the frequency is raised will be proportionately reflected also in the lowered susceptibility of the system to external noises such as from power lines.

The cross-talk curve has been plotted in db. in order to make available a ready comparison with the increase of attenuation with frequency and thus to bring out the fact that in a long line circuit the susceptibility of the system to noise interference decreases more rapidly than the increased gain required in the terminal apparatus to offset the conductor attenuation. This is a fact of unusual importance because, as noted above, of its bearing on the permissible repeater spacings and size of amplifiers required. These particular curves have been carried only to 10 kc. because the theoretical cross-talk or interference susceptibility figures for still higher frequencies are so small as to be almost incomprehensibly minute as compared with present practices. It seems, in fact, that whereas the permissible repeater gains for present day open wire or cable circuits are now established with the line noise and vacuum tube carrying capacity as lower and upper limits, respectively, in a concentric conductor system there are prospects of applying gains of a much higher order, 100 db. or more (as contrasted with 30 to 45 db. for open wire and cable practice) and bringing in office cross-talk or even the resistance noise due to thermal agitation as factors in establishing the practical limit of the degree of amplification.

In order to understand the freedom of this type of conductor system from interference, it should be remembered that the interference between any two circuits is due to the fact that the one circuit lies within either the electric field, or the magnetic field, or both, of the other circuit. Considering first the magnetic field, let us consider two conductors $a$ and $b$ circular in cross-section and arranged side by side, one acting as a return for the other. These conductors are shown in section in Fig. 6. The lines of force due to the magnetic field surround each conductor and are crowded together in the space between the two conductors. Any other conducting system introduced at a point where the conductors of such other system will be cut by these lines of force will have induced therein cross-talk from the conductor system $a$—$b$. If now, we have two conductors 10 and 12, as shown in Fig. 5, in the form of hollow shells concentrically arranged and the one acting as a return for the other, each conductor has lines of magnetic force surrounding it, each successive line of force being of larger radius and all of the lines, due to the current flowing in the particular conductor, such as 12 being external thereto. As the current flows in one direction through the conductor 12 and in the opposite direction through the conductor 10, the lines of magnetic force due to the current through the conductor 12 are in one direction, as indicated by the arrows, while those due to the current flowing in the conductor 10 are in the opposite direction. Now an inspection of Fig. 5 shows that some of the lines of force due to the current in the conductor 12 are within the conductor 10, but none are within the conductor 12. On the other hand, all of the lines of force due to the current flowing in the conductor 10 are external to said conductor, and the two magnetic fields produced by the currents flowing in the two conductors tend to oppose each other outside of the conductor 10. The resultant field of magnetic force external to the conductor 10 is, therefore, very small, and the only effective magnetic field lies within the space between the two conductors. Since the external magnetic field is very small it is obvious that another conductive system external to the conductor 10 will not receive any appreciable amount of cross-talk interference from the conducting system 10—12.

In so far as the electric field is concerned, the distribution of the field in the case of two parallel conductors $a$ and $b$ is as indicated in Fig. 8, so that any external conductor which is cut by the lines of electric force between $a$ and $b$ will have cross-talk induced therein.

In the case of the two concentric conductors 10—12, however, the electric field set up due to currents flowing in the two conductors is entirely between the adjacent surfaces of the two conductors, as indicated in Fig. 7. No external conductor can possibly be cut by any of the lines of the electric field due to current flowing in the conductor 12 and returning in the conductor 10, or vice versa, and hence so far as the electric field is concerned, no possible external interference can take place.

The concentric arrangement not only has the advantage that it produces substantially no external field to interfere in other circuits, but it is practically free from interference due to any external source. For example, referring to Fig. 9, let us assume that some external force produces a field as represented by the arrows. The lines of force cutting the two concentric conductors produce differences in potential between points of the two conductors. For example, consider the points $c$ and $d$, the one on the outer surface of the conductor 12 and the other on the inner surface of the conductor 10. The lines of force cutting the two conductors produce an induced E. M. F. between these points in the direction and having the value indicated by the arrow $c—d$. Since the same number of lines of force cut the two conductors on the opposite side of the diagram, a difference in potential indicated by the arrow $c'—d'$ will be produced between the two points $c'$ and $d'$. The induced potential $c—d$, however, tends to produce a current flow equal to and opposite that caused by the difference of potential at $c'—d'$, so that a balance is obtained. Due to the symmetry of the conducting system with respect to the cutting lines of force, all differences in potential induced between any other two points will be balanced by similar differences of potential induced at corresponding points on the opposite side, so that if the interfering field is evenly distributed through the cross-sectional area of the conducting system (as would be the case where the interfering source is not too near the system), substantially no interfering effect would result in the conducting system 10—12. While the foregoing explanation only applies to fields perpendicular to the axis of the conducting system, field components parallel to the axis are also prevented from causing interference. This is because the skin effect in the outer conductor furnishes protection against such fields.

As has been previously stated, the concentric conducting system is free from external interference even though the outer conductor be grounded, and hence there is no necessity for insulating the outer conductor from metallic supports in case it is mounted like an overhead cable, or from ground in case it is placed in a conduit. The reason for this is that a ground return circuit is noisy, due to the fact that a wire supported above ground forms with the ground a loop to pick up stray fields. But from the diagram of Fig. 9 it is evident that if the outer conductor such as 10 is grounded so that it in effect becomes a ground return for the tube 12, it is only the space between the two concentric conductors that acts as the loop to pick up stray fields. Hence, as has been just explained in connection with Fig. 9, substantially no interfering currents are induced in the conductors 10—12.

*Repeater circuits*

The repeater in a system of this type presents the interesting possibility of carrying in one set of tubes either a few very broad band channels as required for television, or hundreds of narrower band channels for ordinary telephone or telegraph purposes.

By reason of the fact that the system due to its low cross-talk can be operated at very low transmission levels, and by reason of the other transmission characteristics, previously noted, it will be possible in many cases for the output tubes of the terminal amplifiers or of the intermediate repeaters to have no more than a very modest carrying capacity. Of course, if necessary, powerful tubes having substantial output capacity of the order of hundreds or even thousands of watts may be used. It may in some cases prove economical at repeater stations to break up the total frequency range into major subdivisions and pass them individually through separate amplifiers.

Apparatus illustrating alternative repeater arrangements is shown in Figs. 10, 11 and 12. In Fig. 10 is shown a single two-wire concentric conductor system in which the frequency range is split into two parts for opposite directional transmission. The repeater installation comprises filters REF—REF' and RWF—RWF' for separating the opposite directional groups of frequencies. A high gain amplifier RE functions to amplify the band of frequencies transmitted from west to east, and a corresponding amplifier RW amplifies the band or group of sub-bands transmitted from east to west. Attenuation equalizers REE and RWE of well known type will be associated with the amplifiers as illustrated for the purpose of controlling the relative gain required for the different portions of the frequency range transmitted through the different amplifiers, the degree of equalization being determined by the relative attenuation and noise values at the different frequencies.

Fig. 11 shows a concentric conductor system arranged for four-wire operation, that is, with separate concentric conductor pairs for transmission in opposite directions. This arrangement avoids the use of the filters for separating the opposite directions of transmission.

It should be noted particularly in connection with four-wire operation, that if repeater points are widely spaced to permit taking advantage of the very high repeater gains permissible by virtue of the favorable line characteristics previously pointed out, there is presented the serious problem of amply separating the opposite directions of transmission at each repeater point in such a manner as to reduce cross-talk in the repeater station. The huge transmission level difference involved, with no frequency separation available to add a factor of selectivity will require unusually complete shielding of the east-to-west from the west-to-east amplifier circuits. For this purpose each amplifier unit may be installed in a separate sheet metal room or enclosure, as indicated schematically in dotted lines in Figs. 10, 11 and 12. If desired, the same construction may be applied to the terminal apparatus.

Fig. 12 of the drawings illustrates two-way operation with a multi-conductor circuit comprising three concentric tubes, the inner and middle tube serving as a metallic conductor in one direction and the outer and middle tube serving as the path for the return direction. Because at the high frequencies for one direction of transmission the currents tend to be conveyed on the outer surface of the innermost conductor and the inner surface of the middle conductor, and in the other direction between the outer surface of the middle conductor and the inner surface of the outer conductor, the middle conductor may be used in common for the two directional paths without appreciable cross-talk between the two directions and substantially as though the middle conductor instead of being solid metallically consisted of an inner and an outer sheath with insulation between the two.

Fig. 13 illustrates another alternative repeater layout. Each direction of transmission is separated by several filters such as $REF_1$, $REF_2$, etc., and $RWF_1$ and $RWF_2$, etc., into different groups to provide more or less separate amplifiers for different frequency ranges. In the case of the operation in a single direction it is not necessary for the filters such as $REF_1$, $REF_2$, etc., of the amplifiers to sharply discriminate where one takes on and another leaves off at any frequency. It is desirable, however, that adjacent filter cut-offs overlap sufficiently and engage so smoothly that none of the transmission is unduly attenuated.

Terminal apparatus

The terminal apparatus required to make effective use of the wide band of frequency spectrum provided by the concentric conductor system presents of itself important and unique problems. The optional connection of different terminal apparatus has already been described with reference to Fig. 1. The simultaneous transmission of a complete television system together with a talking circuit is schematically shown in Fig. 14. In this figure, persons at the two terminals of the circuit are able to converse in two directions by means of the telephone channel and also to see each other over the television apparatus comprising transmitting equipment $TVT_1$—$TVT_2$ and receiving equipment $TVR_1$—$TVR_2$. This requires the use simultaneously of three bands of frequency: the voice band which is used for the two directions of talking and which is separated out by the low-pass filters $LPF_1$ and $LPF_2$ at the terminals; the one-way television band separated by the band-pass filters $BPF_1$ and $BPF_2$; and the other directional television band separated by the high-pass filters $HPF_1$ and $HPF_2$. This arrangement would obviously require a similar filter separation of frequencies for the purposes of separate amplification at repeater points. Such a group-separated concentric conductor might, of course, optionally be switched to carrier terminal apparatus to carry a group of carrier telephone channels as indicated at $CT_1$ and $CT_2$.

The television equipment such as $TVT_1$, $TVR_1$, etc., at the terminal may be of any well known type. A television apparatus suitable for the purpose indicated is described in a symposium on television, published in the Bell System Technical Journal of October, 1927, vol. VI, No. 4, pages 551 to 652, reference being made more particularly to the paper by Frank Gray, J. W. Horton and R. C. Mathes, beginning at page 560 of the symposium.

The separation of the several channels of the multi-channel telephone system may be accomplished as illustrated in Fig. 15. Here each channel has associated with it its own sending and receiving band filters such as $MBF_1$ and $DBF_1$, said filters carving out narrow bands of a few thousand cycles each in the wide frequency spectrum. Preferably the sending and receiving bands will be different and will be grouped to permit convenient handling for amplification at terminals and repeater points. For example, the sending channels are grouped through directional filters such as DFE and DFW to enable common amplification of a group of channels by amplifiers such as TTA and TRA. Modulators and demodulators of known type are provided for each channel, as indicated symbolically on the drawings, and the receiving and transmitting channels are connected in pairs to two-wire terminals through hybrid coils, as indicated.

The problem of selectively picking out channel bands a few hundred or a few thousand cycles wide in a complete range of say, one million or two million cycles, is, however, not an easy one to accomplish efficiently by means of simple band filter selection directly at the line carrier frequency. This is because of the relative inefficiency of the selecting circuits where the band to be selected has a width which is small as compared with the absolute frequency at which the selection takes place. For this reason, double modulation and double demodulation methods would seem to offer a more desirable technique.

Such an arrangement is illustrated in Fig. 16. In this system the operation at each terminal may be regarded as involving several steps. As viewed from the concentric conductor line circuit, the first step is a separation of the opposite directional channel groups into two general groups by high and low-pass directional filters such as DFE and DFW. For example, as illustrated, in a concentric conductor circuit capable of transmitting up to, say, 2,000 kc., the one directional group would transmit from 0 to 1,000 kc. and the other directional group from 1,000 to 2,000 kc.

The second step consists in dividing, by means of band filters such as $MBF_a$, $DBF_b$, etc., the major groups into fairly large subgroups of, say, 21 kc. in width. Beyond these band filters are second stage modulators such as $M_a$ in the case of a transmitting subgroup and first stage demodulators such as $D_a$ in the case of a receiving subgroup. Said demodulators function to step down the frequency so that whereas the range of 21 kc. represented during transmission over the conductor system a band width anywhere in the broad frequency spectrum, after demodulation the frequencies are stepped down so that the same band width has its lower edge at zero frequency. On the other hand, the second stage modulator functions to step up a band consisting of a group of sub-bands whose lower edge is at zero frequency, to some desired point in the frequency spectrum at which transmission of that group is to take place over the concentric conductors.

The next step outwardly from the concentric conductor involves the subdivision of the subgroups of about 21 kc. into, say, five individual telephone channel bands which, after being stepped down, are readily separable by means of band filters of the ordinary carrier telephone type. This separation is effected by means of filters such as $MBF_1$, $DBF_1$, etc. As the corresponding transmitting and receiving channels are finally transmitted over the concentric conductor in entirely different frequency ranges, it is possible in this lower frequency stage of the operation to use the same frequency band for both transmission and reception. Accordingly, the modulators such as $M_1$ and the corresponding demodulators such as $D_1$ are supplied with the same carrier frequency, but a different carrier frequency is supplied for each two-way channel, the various carrier frequencies being about 3 kc. apart. The band filters will be preferably arranged to suppress the upper side-band resulting from modulation in each case so that with five channels employing five carrier frequencies of 6, 9, 12, 15 and 18 kc., the useful band transmitted will extend from about 3 kc. up to 18 kc., leaving a range of about 3,000 kc. at each edge of the 21-kc. band for separation between adjacent groups as they are transmitted over the concentric conductor system.

Obviously in a case of telegraph channels, a further step of demodulation would be desirable to permit the separation of channels only a few hundred cycles apart.

This arrangement lends itself readily to the use of a carrier frequency supply system controlled by a common frequency source in order that the carrier frequency intervals may be accurately maintained. In the case illustrated in Fig. 16, at each terminal there is provided an oscillator O of exceptionally high frequency stability at 3,000 cycles. By means of a harmonic producer HP of known type the required modulation and demodulation frequencies of 6, 9, 12, 15 and 18 kc. may be obtained as harmonics of the fundamental frequency of 3,000 cycles. These frequencies are selected by tuned circuit and amplifying arrangements such as TC and transmitted to the proper modulators or demodulators, as the case may be. The harmonic producer HP also produces a harmonic frequency of 21 kc. which, in turn, is stepped up by a second stage or group harmonic producer GHP for producing the intermediate frequency demodulation (or modulation) carriers which are illustrated as being multiples of 21 kc. These high carriers are in turn selected by tuned circuit and amplifying arrangements symbolically represented at GTC for transmission to the proper high frequency modulators and demodulators. As illustrated, stabilized primary sources of 3,000 cycles are provided at each terminal. If preferred, however, a single primary source may be employed at one terminal and transmitted over the line circuit for use at the further terminal as a source from which the various carriers at that terminal may be produced by harmonic generation.

*Tandem modulation*

Still another method of separating the channels of a carrier telephone (or telegraph) system at the terminals of a concentric conductor is illustrated in Figs. 17 to 20, inclusive. These figures illustrate what might be termed a tandem modulation step-up and step-down system. The transmitting terminal of such an arrangement is illustrated schematically in Fig. 17. Here we have a unit of equipment comprising a step-up apparatus, a high-pass filter, and a low-pass filter for each signal channel, the equipment units for all of the channels being identical and therefore interchangeable. For example, the equipment for voice channel No. 2 is illustrated as comprising a step-up apparatus $M_2$ in whose input circuit two branches are arranged, one having included therein a high-pass filter $HPF_2$ and the other having included therein a low-pass filter $LPF_2$. The output of the step-up apparatus is to be connected to the input branch of the succeeding unit which contains the high-pass filter. The operation is as follows:

It may be assumed that a voice transmitter is connected at point 1 and the voice currents pass through the low-pass filter $LPF_1$ to step-up apparatus $M_2$ which is arranged to transmit in effect at its output the upper side-band corresponding to a carrier frequency of 3,000 cycles. This results in a displacing of the band upwards to the position indicated at A in the chart, just below the diagrammatic representation of the equipment. The output of this unit passes through the filter $HPF_2$ of the succeeding unit to the step-up apparatus $M_2$, having been joined by a second voice band at point 2, the second band entering through the low-pass filter $LPF_2$. The step-up apparatus $M_2$ is likewise arranged to effect a frequency step-up of 3,000 cycles, and steps up both bands together. This operation having been effected, the number one and two bands are now in position to be joined by a third band in an identical unit assigned to the third voice channel and so on in tandem, each successive unit stepping up and adding a new voice band (see chart of Fig. 17) until the available frequency range transmitted by the concentric conductor is fully used up. The peculiar advantage of an arrangement of this sort is that no very high frequency filters are required, and each set of apparatus is identical with every other set of apparatus.

At a receiving terminal, as shown in Fig. 18, an inverse operation takes place. Here each unit comprises a step-down apparatus such as $D_{00}$ for stepping the wide band received down 3,000 cycles, the output of the step-down apparatus having two branches in one of which is included a high-pass filter such as $HP_{00}$ and in the other of which is included a low-pass filter such as $LPF_{00}$. The latter filter picks off the lower voice band which has been stepped down to its normal range and the high-pass filter passes the remaining bands on to the next unit. Similarly, the next unit steps down the remaining voice bands of the total band by 3,000 cycles and permits another voice band to be taken off in its normal frequency range, passing the others on to the next unit and so on in tandem, each equipment unit providing a single band step-down and being identical with every other unit. The effect of stepping down and successively selecting out one voice band at a time is indicated by the chart immediately below the equipment diagram in Fig. 18.

The step-up apparatus of Fig. 17 and the corresponding step-down apparatus of Fig. 18 may be a simple type of modulator in which the carrier frequency supplied thereto represents the degree to which any desired band may be stepped up or stepped down, so long as the number of voice bands to be successively added does not total up a frequency range greater than that of the carrier frequency itself. However, where the total band to be handled by the modulator or demodulator circuit has a width substantially greater than the frequency step-up and step-down desired, a double modulation method might preferably be employed because of difficulties in separating the various modulation components. This method consists, at the transmitting end, in having one modulator supplied with a carrier whose frequency is high as compared with the band width to be transmitted, separating one side-band and then again modulating or demodulating by a carrier whose frequency is less than that of the carrier supplied to the first modulator by an amount equal to the net frequency step-up desired (3,000 cycles in the case illustrated). Similarly, at the receiving terminal a double modulating unit might be employed, in which the carrier supplied to the second modulator differs from that supplied to the first by being greater by an amount equal to the net step-down in frequency required.

A step-up arrangement suitable for use at the transmitting end is schematically shown in Fig. 19. It will be understood that the equipment shown in this figure may be used for any of the pieces of apparatus such as $M_1$, $M_2$, $M_3$, etc., of Fig. 17. Two modulating tubes MM and MM' are provided and arranged in tandem. To the input of the first tube MM, a range of frequencies comprising one or more bands may be applied. Assuming that this range of frequencies extends from a frequency $f_1$ to a frequency $f_2$ and that a carrier frequency $c$ is also supplied to the tube MM, it is evident that in the output circuit of the tube there will appear in addition to the frequency component $c$ an upper band extending from $c+f_1$ to $c+f_2$ and a lower band extending from $c-f_1$ to $c-f_2$. A high pass filter HP is interposed between the output circuit of the tube MM and the input circuit of the tube MM' having a cut-off such as to suppress all frequencies from zero up to the carrier frequency component $c$, while freely transmitting all frequencies substantially higher than the carrier frequency $c$. As a result, the upper band extending from $c+f$ to $c+f_2$ is passed by the filter and enters the input of the modulator MM′ where it beats with a carrier frequency of $c-3,000$ cycles to produce in the output circuit, in addition to the carrier frequency component, an upper side-band extending from $2c+f_1-3,000$ to $2c+f_2-3,000$, and a lower side-band extending from $f_2+3,000$ down to $f_1+3,000$. A low-pass filter LF is included in the output circuit of the tube MM′ having a cut-off such as to suppress all frequencies from and including the carrier frequency $c-3,000$ up to infinity. The result is that in the output side of this filter only the lower side-band from $f_1+3,000$ to $f_2+3,000$ appears. The net result of the entire operation is that the band from $f_1$ to $f_2$ initially applied is stepped up 3,000 cycles.

The corresponding step-down apparatus for a receiving unit such as illustrated in Fig. 18 is shown schematically in Fig. 20. Here the apparatus is just the same as in the case of Fig. 19 except that the carrier frequency supplied to the second stage modulator MM′ is $c+3,000$ instead of $c-3,000$, and the cut-off point of the low-pass filter LF may be made 6,000 cycles higher than in the case of Fig. 19, especially if the carrier frequency of the second modulator is close to the upper limit of the ultimate lower side-band which is to be passed. As ordinarily it would be desirable to have the carrier frequency substantially higher than the highest frequency of any lower side-band which may be involved, the filter LF could in such case be made identical with the corresponding filter of Fig. 19.

The operation is similar to that of Fig. 19. Assuming that a band extending from $f_1+3,000$ to $f_2+3,000$ is applied to the input of the modulator MM and the modulator is supplied with the carrier frequency $c$, frequencies will appear in the output circuit of the modulator, as indicated above the diagram. The high-pass filter HPF will then select the upper side-band comprising frequencies from $c+f_1+3,000$ to $c+f_2+3,000$, and this band will then be applied to the modulator MM′ together with the carrier frequency $c+3,000$. This produces in the output of the modulator MM′ the carrier frequency components and the two side-bands indicated above the output circuit of the modulator in the diagram. The lower side-band extending from $f_1$ to $f_2$ is selected and passed by the filter LF, the upper side-band and carrier being suppressed. Consequently, the net result is to shift down the band originally applied by 3,000 cycles.

As already stated, the tandem modulator arrangement has the advantage of the unification of the apparatus required and but two sources of carrier supply are needed for the two kinds of modulators at the sending and receiving terminals, these two carrier frequencies differing in frequency about 3,000 cycles. Since it is desired that all the channels be held rigidly in position at intervals which are multiples of this frequency difference of 3,000 cycles, it may be desirable to provide an unusually stable source of this difference frequency and by modulation on a higher carrier provide two frequencies more accurately spaced than would result from the use of two independent high frequency sources. In other words, if the carrier frequency $c$ for the first modulator is supplied by one oscillator, the carrier frequency $c-3,000$ (or $c+3,000$) may be obtained by modulating the carrier frequency $c$ by a 3,000-cycle frequency obtained from a very stable oscillator.

It will be obvious that the general principles herein disclosed may be embodied in many other organizations widely different from those illustrated, without departing from the spirit of the invention as defined in the following claims.

What is claimed is:

1. In a conducting system for the communication of intelligence, two conductors connected one as a return for the other, each conductor being in the form of a cylinder of conductive material and the two conductors being arranged concentrically one inside the other, means to prevent moisture from entering the interior of the outer conductor, insulating means for separating the conductors electrically and for maintaining them in concentric relation, said insulating means being so formed that the dielectric between the adjacent surfaces of the conductors will be principally gaseous, and apparatus at the terminals of the conductors for supplying thereto and receiving and utilizing therefrom a range of transmitted frequencies extending from in the neighborhood of the audible range to a frequency of the order of megacycles, said range of frequencies being transmitted without undergoing a materially higher order of attenuation than an audible range of frequencies transmitted over an equal length of cable pair.

2. In a conducting system for the communication of intelligence, two conductors connected one as a return for the other, each conductor being in the form of a shell of conductive material and having a diameter large as compared with its wall thickness so that its attenuation will be relatively small at high frequencies, said conductors being arranged concentrically one inside the other, means to prevent moisture from entering the interior of the outer conductor, insulating means for separating the conductors electrically and for maintaining them in concentric relation, said insulating means being so formed that the dielectric between the adjacent surfaces of the conductors will be principally gaseous, and apparatus at the terminals of the conductors for supplying thereto and receiving and utilizing therefrom a range of transmitted frequencies extending from in the neighborhood of the audible range to a frequency of the order of megacycles, said range of frequencies being transmitted without undergoing a materially higher order of attenuation than an audible range of frequencies transmitted over an equal length of cable pair.

3. In a conducting system for the communication of intelligence, two conductors connected one as a return for the other, each conductor being in the form of a cylinder of conductive material and the two conductors being arranged concentrically one inside the other, means to prevent moisture from entering the interior of the outer conductor, insulating elements to separate the conductors electrically and to maintain them in concentric relation, said insulating elements being of such form and and being so spaced that the dielectric between the adjacent surfaces of the conductors will be principally gaseous, and apparatus at the terminals of the conductors for supplying thereto and receiving and utilizing therefrom a range of transmitted frequencies extending from in the neighborhood of the audible range to a frequency of the order of megacycles, said range of frequencies being transmitted without undergoing a materially higher order of attenuation than an audible range of frequencies transmitted over an equal length of cable pair.

4. In a conducting system for the communication of intelligence, two conductors connected one as a return for the other, each conductor being in the form of a shell of conductive material and having a diameter large as compared with its wall thickness so that its attenuation will be relatively small at high frequencies, said conductors being arranged concentrically one inside the other, means to prevent moisture from entering the interior of the other conductor, insulating elements to separate the conductors electrically and to maintain them in concentric relation, said insulating elements being of such form and being so spaced that the dielectric between the adjacent surfaces of the conductors will be principally gaseous, and apparatus at the terminals of the conductors for supplying thereto and receiving and utilizing therefrom a range of transmitted frequencies extending from in the neighborhood of the audible range to a frequency of the order of megacycles, said range of frequencies being transmitted without undergoing a materially higher order of attenuation than an audible range of frequencies transmitted over an equal length of cable pair.

5. In a system for the communication of intelligence, a conductor arrangement comprising two conductors connected one as a return for the other, each conductor being in the form of a cylinder of conductive material and the two conductors being arranged concentrically one inside the other, the dielectric between the outer surface of the inner conductor and the inner surface of the outer being largely gaseous and the conductors being of such size that transmission may be obtained over a distance of at least fifty miles for a band of frequencies whose upper limit is many times as high as the upper frequency limit of audibility without passing beyond the limit of allowable interference, and apparatus at the terminals of such conductor arrangement for supplying to and receiving therefrom and utilizing the wide band available.

6. In a system for the communication of intelligence, a conductor arrangement comprising two conductors connected one as a return for the other, each conductor being in the form of a cylinder of conductive material and the two conductors being arranged concentrically one inside the other, the dielectric between the outer surface of the inner conductor and the inner surface of the outer being largely gaseous and the conductors being of such size that transmission may be obtained over a distance of at least fifty miles for a band of frequencies whose upper limit is many times as high as the upper frequency limit of audibility without passing beyond the limit of allowable interference, and apparatus at the terminals of such conductor arrangement for supplying to and receiving therefrom and utilizing the wide band available, said terminal arrangement including television apparatus.

7. In a system for the communication of intelligence, a conductor arrangement comprising two conductors connected one as a return for the other, each conductor being in the form a cylinder of conductive material and the two conductors being arranged concentrically one inside the other, the dielectric between the outer surface of the inner conductor and the inner surface of the outer being largely gaseous and the conductors being of such size that transmission may be obtained over a distance of at least fifty miles for a band of frequencies whose upper limit is many times as high as the upper frequency limit of audibility without passing beyond the limit of allowable interference, and apparatus at the terminals of such conductor arrangement for supplying to and receiving therefrom and utilizing the wide band available, said terminal arrangement including means to utilize part of the available range for television and part of the range for signal communication.

8. In a system for the communication of intelligence, a conductor arrangement comprising two conductors connected one as a return for the other, each conductor being in the form of a cylinder of conductive material and the two conductors being arranged concentrically one inside the other, the dielectric between the outer surface of the inner conductor and the inner surface of the outer being largely gaseous and the conductors being of such size that transmission may be obtained over a distance of at least fifty miles for a band of frequencies whose upper limit is many times as high as the upper frequency limit of audibility without passing beyond the limit of allowable interference, and apparatus at the terminals of such conductor arrangement for supplying to and receiving therefrom and utilizing the wide band available, said terminal arrangement including means for dividing the available range into a large number of carrier signaling channels.

9. In a system for the communication of intelligence, a conductor arrangement comprising two conductors connected one as a return for the other, each conductor being in the form of a cylinder of conductive material and the two conductors being arranged concentrically one inside the other, the dielectric between the outer surface of the inner conductor and the inner surface of the outer being largely gaseous and the conductors being of such size that transmission may be obtained over a distance of at least fifty miles for a band of frequencies whose upper limit is many times as high as the upper frequency limit of audibility without passing beyond the limit of allowable interference, and apparatus at the terminals of such conductor arrangement for supplying to and receiving therefrom and utilizing the wide band available, said terminal arrangement including television apparatus and apparatus for dividing the available range into a large number of carrier signaling channels, and means to connect either apparatus to the conductor arrangement at will.

10. In a system for the communication of intelligence, a conductor arrangement comprising two conductors connected one as a return for the other, each conductor being in the form of a cylinder of conductive material and the two conductors being arranged concentrically one inside the other, the dielectric between the outer surface of the inner conductor and the inner surface of the outer being largely gaseous and the conductors being of such size that transmission may be obtained over a distance of at least fifty miles for a band of frequencies extending from in the neighborhood of the audible range to over 100 kilocycles without passing beyond the limit of allowable interference, and apparatus at the terminals of such conductor arrangement for supplying to and receiving therefrom and utilizing the wide band available.

11. In a system for the communication of intelligence, a conductor arrangement comprising two conductors connected one as a return for the other, each conductor being in the form of a cylinder of conductive material and the two conductors being arranged concentrically one inside the other, the dielectric between the outer surface of the inner conductor and the inner surface of the outer being largely gaseous and the conductors being of such size that transmission may be obtained over a distance of at least fifty miles for a band of frequencies extending from in the neighborhood of the audible range to over 100 kilocycles without passing beyond the limit of allowable interference, and apparatus at the terminals of such conductor arrangement for supplying to and receiving therefrom and utilizing the wide band available, said terminal arrangement including television apparatus.

12. In a system for the communication of intelligence, a conductor arrangement comprising two conductors connected one as a return for the other, each conductor being in the form of a cylinder of conductive material and the two conductors being arranged concentrically one inside the other, the dielectric between the outer surface of the inner conductor and the inner surface of the outer being largely gaseous and the conductors being of such size that transmission may be obtained over a distance of at least fifty miles for a band of frequencies extending from in the neighborhood of the audible range to over 100 kilocycles without passing beyond the limit of allowable interference, and apparatus at the terminals of such conductor arrangement for supplying to and receiving therefrom and utilizing the wide band available, said terminal arrangement including means to utilize part of the available range for television and part of the range for signal communication.

13. In a system for the communication of intelligence, a conductor arrangement comprising two conductors connected one as a return for the other, each conductor being in the form of a cylinder of conductive material and the two conductors being arranged concentrically one inside the other, the dielectric between the outer surface of the inner conductor and the inner surface of the outer being largely gaseous and the conductors being of such size that transmission may be obtained over a distance of at least fifty miles for a band of frequencies extending from in the neighborhood of the audible range to over 100 kilocycles without passing beyond the limit of allowable interference, and apparatus at the terminals of such conductor arrangement for supplying to and receiving therefrom and utilizing the wide band available, said terminal arrangement including means for dividing the available range into a large number of carrier signaling channels.

14. In a system for the communication of intelligence, a conductor arrangement comprising two conductors connected one as a return for the other, each conductor being in the form of a cylinder of conductive material and the two conductors being arranged concentrically one inside the other, the dielectric between the outer surface of the inner conductor and the inner surface of the outer being largely gaseous and the conductors being of such size that transmission may be obtained over a distance of at least fifty miles for a band of frequencies extending from in the neighborhood of the audible range to over 100 kilocycles without passing beyond the limit of allowable interference, and apparatus at the terminals of such conductor arrangement for supplying to and receiving therefrom and utilizing the wide band available, said terminal arrangement including television apparatus and apparatus for dividing the available range into a large number of carrier signaling channels, and means to connect either apparatus to the conductor arrangement at will.

15. In a system for the communication of intelligence, a conductor arrangement comprising two conductors connected one as a return for the other, each conductor being in the form of a cylinder of conductive material and the two conductors being arranged concentrically one inside the other, the dielectric between the outer surface of the inner conductor and the inner surface of the outer being largely gaseous and the conductors being of such size that transmission may be obtained over a distance of at least fifty miles for a band of frequencies extending from in the neighborhood of the audible range to a high frequency of the order of 1,000 kilocycles or more without passing beyond the limit of allowable interference, and apparatus at the terminals of such conductor arrangement for supplying to and receiving therefrom and utilizing the wide band available.

16. In a system for the communication of intelligence, a conductor arrangement comprising two conductors connected one as a return for the other, each conductor being in the form of a cylinder of conductive material and the two conductors being arranged concentrically one inside the other, the dielectric between the outer surface of the inner conductor and the inner surface of the outer being largely gaseous and the conductors being of such size that transmission may be obtained over a distance of at least fifty miles for a band of frequencies extending from in the neighborhood of the audible range to a high frequency of the order of 1,000 kilocycles or more without passing beyond the limit of allowable interference, and apparatus at the terminals of such conductor arrangement for supplying to and receiving therefrom and utilizing the wide band available, said terminal arrangement including television apparatus.

17. In a system for the communication of intelligence, a conductor arrangement comprising two conductors connected one as a return for the other, each conductor being in the form of a cylinder of conductive material and the two conductors being arranged concentrically one inside the other, the dielectric between the outer surface of the inner conductor and the inner surface of the outer being largely gaseous and the conductors being of such size that transmission may be obtained over a distance of at least fifty miles for a band of frequencies extending from in the neighborhood of the audible range to a high frequency of the order of 1,000 kilocycles or more without passing beyond the limit of allowable interference, and apparatus at the terminals of such conductor arrangement for supplying to and receiving therefrom and utilizing the wide band available, said terminal arrangement including means to utilize part of the available range for television and part of the range for signal communication.

18. In a system for the communication of intelligence, a conductor arrangement comprising two conductors connected one as a return for the other, each conductor being in the form of a cylinder of conductive material and the two conductors being arranged concentrically one inside the other, the dielectric between the outer surface of the inner conductor and the inner surface of the outer being largely gaseous and the conductors being of such size that transmission may be obtained over a distance of at least fifty miles for a band of frequencies extending from in the neighborhood of the audible range to a high frequency of the order of 1,000 kilocycles or more without passing beyond the limit of allowable interference, and apparatus at the terminals of such conductor arrangement for supplying to and receiving therefrom and utilizing the wide band available, said terminal arrangement including means for dividing the available range into a large number of carrier signaling channels.

19. In a system for the communication of intelligence, a conductor arrangement comprising two conductors connected one as a return for the other, each conductor being in the form of a cylinder of conductive material and the two conductors being arranged concentrically one inside the other, the dielectric between the outer surface of the inner conductor and the inner surface of the outer being largely gaseous and the conductors being of such size that transmission may be obtained over a distance of at least fifty miles for a band of frequencies extending from in the neighborhood of the audible range to a high frequency of the order of 1,000 kilocycles or more without passing beyond the limit of allowable interference, and apparatus at the terminals of such conductor arrangement for supplying to and receiving therefrom and utilizing the wide band available, said terminal arrangement including television apparatus and apparatus for dividing the available range into a large number of carrier signaling channels, and means to connect either apparatus to the conductor arrangement at will.

20. In a conducting system for the communication of intelligence, two conductors connected one as a return for the other, each conductor being in the form of a cylinder of conductive material and the two conductors being arranged concentrically one inside the other, means to prevent moisture from entering the interior of the outer conductor, insulating means for separating the conductors electrically and for maintaining them in concentric relation, said insulating means being so formed that the dielectric between the adjacent surfaces of the conductors will be principally gaseous, and repeaters at intermediate points in said conductor arrangement, the conductor section between repeaters being of such length that currents transmitted thereover will have been attenuated before amplification to a value lower than the ordinary limit of allowable cross-talk from paralleling circuits.

21. In a conducting system for the communication of intelligence, two conductors connected one as a return for the other, each conductor being in the form of a cylinder of conductive material and the two conductors being arranged concentrically one inside the other, means to prevent moisture from entering the interior of the outer conductor, insulating means for separating the conductors electrically and for maintaining them in concentric relation, said insulating means being so formed that the dielectric between the adjacent surfaces of the conductors will be principally gaseous, and repeaters at intermediate points in said conductor arrangement, the conductor sections between repeaters being of such length that currents transmitted thereover will have been attenuated before amplification to a value so low as to approach the level of noise due to thermal agitation in the conductors themselves.

22. In a system for the communication of intelligence, a line circuit comprising two conductors connected one as a return for the other, the two conductors being arranged concentrically, and apparatus at the terminals of said circuit for supplying thereto and receiving and utilizing therefrom a range of transmitted frequencies extending from in the neighborhood of the audible range to a frequency of the order of megacycles, said wide range of frequencies being transmitted without undergoing a materially higher order of attenuation than an audible range of frequencies transmitted over an equal length of cable pair.

23. In a system for the communication of intelligence, a line circuit comprising two conductors connected one as a return for the other, the two conductors being arranged concentrically, and apparatus at the terminals of said circuit for supplying thereto and receiving and utilizing therefrom a range of simultaneously transmitted frequencies extending from in the neighborhood of the audible range to a frequency of the order of megacycles, said wide range of frequencies being transmitted without undergoing a materially higher order of attenuation than an audible range of frequencies transmitted over an equal length of cable pair.

24. In a signal communication system, a line circuit comprising two conductors connected one as a return for the other, the two conductors being arranged concentrically and separated by a dielectric consisting principally of air, said conductors being of such size as to permit the transmission of a range of frequencies many times the width of the audible range over a distance of at least fifty miles without passing beyond the limit of allowable interference, and apparatus at the terminals of said circuit for transmitting thereto and receiving and utilizing therefrom such a range of frequencies.

25. In a system for the communication of intelligence, a line circuit comprising two conductors connected one as a return for the other, the two conductors being arranged concentrically and the outer conductor being of such thickness and diameter as to reduce the interference level of the circuit due to external causes over a range of frequencies whose width is many times that of the audible range to a level below that of the resistance noise of the conductors themselves, the conductors being separated by a dielectric consisting principally of air and being of such size as to transmit over a distance of the order of fifty miles a range of frequencies whose width is many times that of the audible range without attenuating the transmitted current to a level too near the resistance noise level, and means at the terminals of the line circuit for supplying thereto and receiving and utilizing therefrom said transmitted range of frequencies.

26. In a signal communication system, a line circuit comprising two conductors connected one as a return for the other, the two conductors being arranged concentrically one inside the other, and apparatus at the terminals of said circuit for supplying thereto and receiving and utilizing therefrom a range of frequencies many times the width of the audible range, the concentric arrangement of the conductors so protecting the circuit from external interference and the length of the conductors being such as to permit an attenuation of the highest transmitted frequency of the order of 50 decibels without passing beyond the limit of allowable interference.

27. In a signal communication system, a line circuit comprising two conductors connected one as a return for the other, the two conductors being arranged concentrically one inside the other and separated by a dielectric consisting principally of air, the conductors being of such size that a band of frequencies extending from the audible range to a frequency many times the upper limit of audibility may be transmitted over a distance corresponding to at least several hundred wave lengths of the highest transmitted frequency, and apparatus at the terminals of the circuit for supplying thereto and receiving and utilizing therefrom the range of frequencies which the circuit is capable of transmitting.

28. In a system for the communication of intelligence, a line circuit comprising two conductors connected one as a return for the other, the two conductors being arranged concentrically and separated by a dielectric consisting principally of air, the conductors being of such size that effective transmission may be obtained over a distance of at least fifty miles for a band of frequencies extending from in the neighborhood of the audible range to a frequency of the order of megacycles, and apparatus at the terminals of said circuit for supplying thereto and receiving and utilizing therefrom said band of frequencies, said terminal arrangement including means for utilizing part of the available range for television and part of the range for multiplex signaling channels.

29. In a system for the communication of intelligence, a line circuit comprising two conductors connected one as a return for the other, the two conductors being arranged concentrically and separated by a dielectric consisting principally of air, the conductors being of such size that effective transmission may be obtained over a distance of at least fifty miles for a band of frequencies extending from in the neighborhood of the audible range to a frequency of the order of megacycles, and apparatus at the terminals of said circuit for supplying thereto and receiving and utilizing therefrom said band of frequencies, said terminal arrangement including means for dividing the frequency band into a large number of signaling channels.

30. In a system for the transmission of intelligence, a line circuit comprising two conductors connected one as a return for the other, the two conductors being arranged concentrically and separated by a dielectric consisting principally of air, the conductors being of such size that effective transmission may be obtained over a distance of at least fifty miles for a band of frequencies extending from in the neighborhood of the audible range to a frequency of the order of megacycles, and apparatus at the terminals of said circuit for supplying thereto and receiving and utilizing therefrom said band of frequencies in the form of a plurality of carrier signaling channels, said apparatus comprising individual modulators and demodulators for shifting the frequency position of each channel, and common modulators and demodulators for shifting the frequency position of a group of channels.

31. In a signal transmission system, a line circuit comprising two conductors connected one as a return for the other, the two conductors being arranged concentrically, means at the terminals to supply to the circuit and receive therefrom a range of frequencies extending from the audible range to a frequency many times the limit of audibility, and repeaters at intermediate points in said line circuit, the section of line circuit between repeaters being of such length as to have an attenuation of at least fifty decibels at the highest transmitted frequency.

32. In a signal transmission system, a line circuit comprising two conductors connected one as a return for the other, the two conductors being arranged concentrically, means at the terminals to supply to the circuit and receive therefrom a range of frequencies extending from the audible range to a frequency many times the limit of audibility, and repeaters at intermediate points in said line circuit, the section of line circuit between repeaters being of such length as to have an attenuation of at least fifty decibels at the highest transmitted frequency, and each repeater including means for equalizing the attenuation of the preceding section.

33. In a system for the transmission of intelligence, two line circuits, each consisting of two conductors connected one as a return for the other, said two conductors being arranged concentrically, and terminal apparatus so connected to the line circuits that one line circuit is used for transmitting in one direction and the other line circuit for transmitting in the opposite direction, said apparatus being arranged to transmit simultaneously over each circuit a band of frequencies extending from in the neighborhood of the audible range up to a frequency of the order of megacycles.

34. In a system for the transmission of intelligence, a system of conductors comprising a cylindrical outer conductor connected as the return for a conductor concentric therewith and constituting one line circuit, an inner conductor also connected to a surrounding return to constitute a second line circuit, and terminal apparatus so connected to the line circuits that one circuit is used for transmitting in one direction and the other line circuit for transmitting in the opposite direction, said apparatus being arranged to transmit simultaneously over each circuit a band of frequencies extending from in the neighborhood of the audible range up to a frequency of the order of megacycles.

35. In a signal communication system, a line circuit comprising two conductors connected one as a return for the other, the two conductors being arranged concentrically one inside the other, repeaters at intermediate points in said circuit, apparatus at the terminals of the circuit for supplying thereto and receiving and utilizing therefrom a range of frequencies many times the width of the audible range, shielding means for said repeaters and terminal apparatus, said shielding means and the concentric arrangement of the conductors so protecting the circuit from external interference and the length of the circuit between repeaters being such as to permit an attenuation of not less than fifty decibels for the highest transmitted frequency without passing beyond the limit of allowable interference at the inputs of the repeaters.

36. In a system for the communication of intelligence, a line circuit comprising two conductors connected one as a return for the other, the two conductors being arranged concentrically and separated by a dielectric consisting principally of air, such conductors being of such size as to permit the transmission of a band of frequencies whose width is many times the audible range without undergoing a materially higher order of attenuation than an audible range of frequencies transmitted over an ordinary cable pair, and apparatus at the terminals of said circuit for supplying thereto and receiving and utilizing therefrom a band of frequencies whose width is many times the audible range.

37. In a signal communication system, a line circuit comprising two conductors connected one as a return for the other, the two conductors being arranged concentrically one inside the other, and apparatus at the terminals of said circuit for supplying thereto and receiving and utilizing therefrom a range of frequencies many times the width of the audible range, the concentric arrangement of the conductors so protecting the circuit from external interference and the dimensions of the conductors being such as to permit an attenuation of the highest transmitted frequency of the order of 50 decibels without passing beyond the limit of allowable interference.

38. In a signal communication system, a line circuit comprising two conductors connected one as a return for the other, the two conductors being arranged concentrically one inside the other, and means including television apparatus at the terminals of said circuit for supplying thereto and receiving and utilizing therefrom a range of frequencies many times the width of the audible range, the concentric arrangement of the conductors so protecting the circuit from external interference and the dimensions of the conductors being such as to permit an attenuation of the highest transmitted frequency of the order of 50 decibels without passing beyond the limit of allowable interference.

39. In a signal communication system, a line circuit comprising two conductors connected one as a return for the other, the two conductors being arranged concentrically one inside the other, and means including television apparatus at the terminals of said circuit for supplying thereto and receiving and utilizing therefrom a range of frequencies many times the width of the audible range, the concentric arrangement of the conductors so protecting the circuit from external interference and the length of the conductors being such as to permit an attenuation of the highest transmitted frequency of the order of 50 decibels without passing beyond the limit of allowable interference.

40. In a system for the communication of intelligence, a line circuit comprising two conductors connected one as a return for the other, the two conductors being arranged concentrically, and means including television apparatus at the terminals of said circuit for supplying thereto and receiving and utilizing therefrom a range of transmitted frequencies extending from in the neighborhood of the audible range to a frequency of the order of megacycles, said wide range of frequencies being transmitted without undergoing a materially higher order of attenuation than an audible range of frequencies transmitted over an equal length of cable pair.

41. In a system for the communication of intelligence, a line circuit comprising two conductors connected one as a return for the other, the two conductors being arranged concentrically, means comprising a television transmitter at one terminal of the circuit for supplying thereto a simultaneously transmitted range of frequencies extending from in the neighborhood of the audible range to such a high frequency as to afford a band sufficiently wide to represent a clearly defined television image, and means including a television receiver for receiving and utilizing from the conductor system said range of simultaneously transmitted frequencies, the conductor system having such attenuation that frequencies in the upper part of the transmitted range will not be unduly attenuated as compared with frequencies in the lower part of the range.

42. In a system for the communication of intelligence, a line circuit comprising two conductors connected one as a return for the other, the two conductors being arranged concentrically, means comprising a television transmitter at one terminal of the circuit for supplying thereto a simultaneously transmitted range of frequencies extending from in the neighborhood of the audible range to such a high frequency as to afford a band sufficiently wide to represent a clearly defined television image, and means including a television receiver for receiving and utilizing from the conductor system said range of simultaneously transmitted frequencies, the concentric arrangement of the conductors so protecting the circuit from external interference and the attenuation being such that the entire band of frequencies is transmitted without material interference.

In testimony whereof, we have signed our names to this specification this 20th day of May, 1929.

LLOYD ESPENSCHIED.
HERMAN A. AFFEL.